United States Patent [19]

Pizzorno et al.

[11] Patent Number: 4,772,194

[45] Date of Patent: Sep. 20, 1988

[54] TIRE VULCANIZING MOULDS

[75] Inventors: Augusto Pizzorno; Giancarlo Gallinotti, both of Milan, Italy

[73] Assignee: Pirelli Coordinamento Pneumatici S.p.A., Italy

[21] Appl. No.: 933,897

[22] Filed: Nov. 24, 1986

[30] Foreign Application Priority Data

Dec. 23, 1985 [IT] Italy ...................... 23377 A/85

[51] Int. Cl.$^4$ ............................................... B29C 35/00
[52] U.S. Cl. ...................... 425/39; 249/134; 249/160
[58] Field of Search .............. 425/28 R, 35, 47, 34 R, 425/38, 44, 39; 264/276; 249/160, 161

[56] References Cited

U.S. PATENT DOCUMENTS

| 784,874 | 3/1905 | Miller | 425/35 |
|---|---|---|---|
| 1,312,627 | 8/1919 | Grube | 425/35 |
| 1,417,509 | 5/1922 | Gammeter | 425/35 |
| 1,513,102 | 10/1924 | Gammeter | 425/35 |
| 4,279,854 | 7/1981 | Blaszkowski | 264/276 |
| 4,501,715 | 2/1985 | Barfield et al. | 264/276 |
| 4,655,699 | 4/1987 | Collier | 425/28 R |

FOREIGN PATENT DOCUMENTS

| 836326 | 1/1939 | France | 425/35 |
|---|---|---|---|
| 0006781 | 1/1977 | Japan | 425/47 |
| 22217 | of 1909 | United Kingdom | 425/35 |
| 104870 | 9/1938 | United Kingdom | 425/28 |

Primary Examiner—Willard E. Hoag
Attorney, Agent, or Firm—Stevens, Davis, Miller & Mosher

[57] ABSTRACT

For eliminating burrs which form on moulded, or injected products, a moulding device and, in particular, a tire-vulcanizing mould, is provided with a plastically and elastically deformable portion on the coupling surface between the corresponding elements. The coupling, between the facing surfaces, is not simultaneous, but involves a portion of surface having an amplitude that increases in its size, during the shutting movement of the mould.

9 Claims, 2 Drawing Sheets

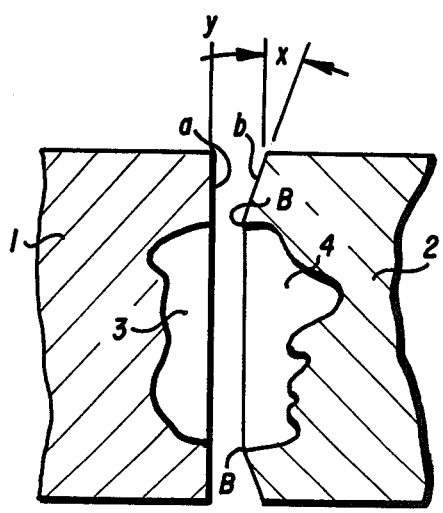
FIG. 1
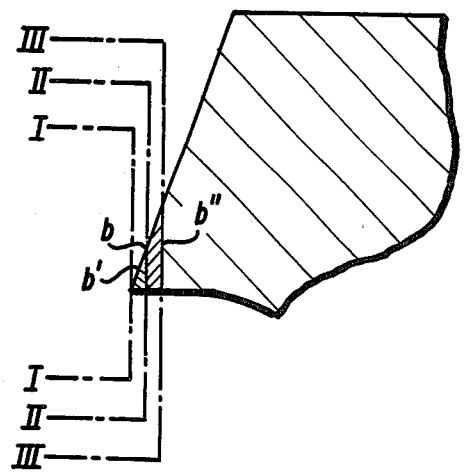
FIG. 2
FIG. 3
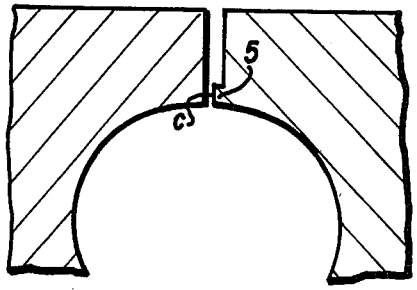
FIG. 4
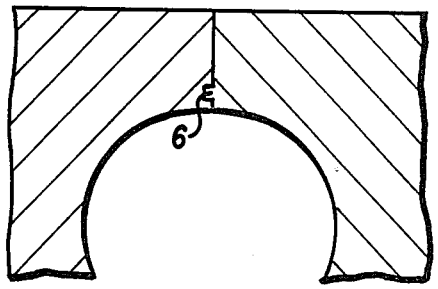
FIG. 5
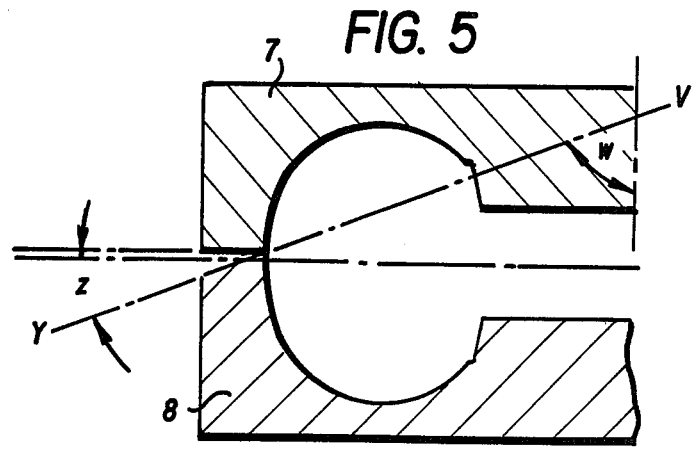

TIRE VULCANIZING MOULDS

DESCRIPTION

The present invention concerns devices for the moulding of elastomeric or plastomeric articles, that henceforth, in this text, shall be defined as 'moulds' and, in particular, those moulds used for moulding and vulcanizing tires.

It is already known that such moulding devices, are generally formed by at least two shells, each one provided with an open hollow, that are alternatively joined and separated from the other. When coupled together the mould halves for a cavity, closed towards the outside. The inside of the mould defines the outer form of the article to be produced.

Depending upon the type of article to be produced and upon the material utilized, the manufacturing process can be carried out through injection or through moulding.

In the first case, a suitable material, having specific characteristics of fluidity, is injected, under high pressure and generally at a high temperature, into the above-described mould cavity with the moulding material thus acquiring the form. Once solidification has taken place, the mould is opened to remove the article produced in this way.

When the article to be produced has a complex shape having many diverse structural elements such as, for example, a tire, this article is pre-manufactured apart, to then be inserted into the moulding cavity. In said tire, a high temperature and high pressure fluid is introduced that renders the elastomeric material of the tire plastic, and presses it against the mould walls, causing the tire to acquire its final configuration and its desired aesthetic aspect.

No matter what process is used, the essential characteristics in such moulding are the high pressure exerted by the material against the mould walls and the fluidity of the material, at the start of the moulding process.

The inevitable consequence of these characteristics, are the burrs that become formed on the article, owing to the extrusion effect of the elastomeric or plastomeric material between the surfaces of the mould-members which are in mating contact.

Above all, these burrs constitute a great economic disadvantage, since they lessen the aesthetic aspect thus damaging the product's image for the buyer. Eliminating burrs from the product, brings about even further working operations with consequently, increasing production costs. Apart from this fact, when the geometrical dimensions are considerable, for example of over one millimeter in thickness and width, they cause a shrinkage of elastomeric material thus compromising the qualitiative 'behaviour' characteristics of the finished product.

Said burrs manage to form more easily in proportion to just how fluid the material is, that is injected or moulded even though the elements of the mould are strongly pressed together for resisting the pressure thrusts acting from inside the mould.

In fact, in the first place, the mould-elements intended for contacting each other, always present angular errors of flatness, in their facing surfaces, which generate coupling irregularities, in the order of a tenth of a millimeter, that are sufficient enough for allowing the material to pass through into the interspace thus created, with the consequent forming of a burr.

Apart from this, when the elements forming the mould present more than one reciprocally coupling surface, the above-said angular errors, and the other dimensional working tolerances, constitute another important cause of the formation of the above-said burrs because of the fact that some pairs of surfaces come into contact prior to other parts thus blocking any further movement of the mould-elements, between which therefore, there remains a spaced that is sufficient for said burrs to form.

Eliminating these irregularities, requires such an accurate operation on the contacting surfaces, as to results as being uneconomical with involving characteristics of such a perfect mating of the surrfaces that result as being either difficult or impossible to maintain, during mould functioning.

The problem results as being even more serious when the mould is more complex and has considerable geometrical dimensions. Let us consider, for example, the usual centripetal type moulds for vulcanizing tires. Such moulds are substantially comprised by two annular, coaxial and contrasting slabs, that block the tire sidewalls, and by a crown of circumferential sectors that close radially against the above-said slabs in such a way as to mould the tire's crown portion.

Hence, each of these sectors present axially circumferential lower and upper surfaces, abutting against the slabs, and radial coupling surfaces in the circumferential direction, against the adjacent sectors.

This complex of reciprocally contacting elements, generates two continuous, circumferential burrs on the tire in the connecting zone between slabs and sectors, and plurality of radial burrs extended over the entire width of the tread-band, in the contacting zone between adjacent sectors; all of these becoming even more imposing when the tire to be produced and hence, the mould, is broader.

At a parity of the working-precision in the contacting surfaces, if it is desired to minimize the radial burrs, the clearance between the adjacent sectors must be reduced, and this fact, of course, causes (as regards what has previously been explained) an increase in the clearances, between sectors and slabs, with a consequent thickening of the circumferential burrs.

Vice-versa, in endeavoring to minimize the circumferential burrs, the clearance, between each sector and the slabs, must be reduced so that the clearance between the diverse sectors will, simultaneously and inevitably, be increased, with a consequent thickening of the radial burrs.

The choice between these two characteristics, is substantially a choice between two evils. Today however, qualitative requirements, aesthetic aspects and tire usage, render the presence of any circumferential burrs to be absolutely unacceptable, with the result therefore, that radial burrs must be tolerated even if proving to be more risky in causing a reduction in the volume of the elastomeric material in the treadband.

The Applicant has now found that by adopting a certain new series of contrivances, it has been made possible to relize moulds that overcome all the difficulties mentioned above. So much so that, the aim of the present invention is a device, for moulding elastomeric or plastomeric articles, that enables for preventing the formation of the above-said burrs, with also guaranteeing the elimination of all the clearances existing between the diverse elements that are in reciprocal contact, and this without requiring a more accurate processing of the surfaces of the elements that comprise the mould.

Therefore, the object of the present invention, is a device for moulding elastomeric or plastomeric articles, comprising at least two substantially hollow elements, which are reciprocally shiftable, one with respect to the other, for being taken alternatively from a first 'shut configuration' of reciprocal contact, whereby they delimit a closed cavity for containing the article to be moulded. A second, reciprocally spaced apart 'open configuration' is used to introduce and/or remove said article from the said cavity. There are means for preventing, during the passage from said 'open configuration' to said 'shut configuration', any simultaneous coupling, that is extended for the entire width of the reciprocally facing surfaces of said elements, while they impose a reciprocal coupling, of an increasable width, between said facing surfaces.

Said means, with which at least one of the two reciprocally-contacting surfaces must be provided, are means which are elastically and plastically deformable on the new device, for which reason they result as being at least partially, permanently deformed plastically, after the first closing operation of said device, and they deform cyclically and elastically during each successive passage from said open configuration to said closed configuration, and vice-versa.

For convenience sake, said means are formed by the inclination of one of the said facing surfaces with respect to the corresponding surface, in ratio to the relative shifting between said surfaces, in such a manner that the contact between said facing surfaces, is established along a narrow rim zone of said cavity, the distance between said facing surfaces increasing progressively in the orthogonal direction to said shifting direction. As an alternative, said means comprise a projecting part made on at least one of the above-said reciprocally facing surfaces and having a lesser area to that of the remaining surface portion, that is extended along a trajectory substantially following the profile of the concave part of the corresponding element.

When the above-said device is, in particular, a two-halves type of vulcanizing mould for tires, the above-said mould comprises two opposed hollow, substantially concave elements, that are reciprocally shiftable axially, in both senses, adapted to define between them a substantially toric cavity, in a position of reciprocal contact, and this mould is characterized by the fact that the surface of one of said hollow elements, that faces the element opposite, is.a conical surface having its apex on the axis of symmetry of said mould and, when the material of said hollow element is steel, the angular opening of said conical surface is not less than 87° sexagesimals.

According to an alternative, just as convenient version, the surface of one of the said hollow elements, that faces the element opposite, is instead provided with a continuous annular projection delimiting the concave part of the corresponding element.

Moreover, if the mould is of the centripetal type, i.e. comprising two annular, coaxial and opposed, substantially concave elements defined as cheeks, axially and reciprocally shiftable in both senses, apt for moulding the sidewalls of said tire, and a plurality of substantially concave radial elements, circumferentially disposed co-axially to said mould, around the said cheeks, defined as sectors, axially shiftable in both senses, with respect to said cheeks, apt for moulding the crown portion of the said tire, then the circumferential surface of one of the said elements which faces the opposed element, is a conical surface having its apex lying on the axis of the mould, from the same side of the surface with respect to the diametral plane of the mould; for steel moulds said conical surface has an angular opening that does not exceed 3° sexagesimals.

Moreover, quite conveniently, at least one of the radial surfaces of each sector facing the adjacent sectors, is provided with a projecting part that delimits the radially inner profile of the concave portion of the said sector. Again, for steel moulds, said projecting part has a height of not over 0.50 mm.

In any case, the present invention will now be better understood with the aid of the following description and from the attached figures, both given solely by way of non-limiting example, whereby:

FIG. 1 illustrates a cross-section of the device according to the invention, in a first embodiment;

FIG. 2 illustrates the solution theory of operation as applied to the device of the invention;

FIGS. 3 and 4 illustrate a cross-section of the device according to a second convenient embodiment;

Figure 6:
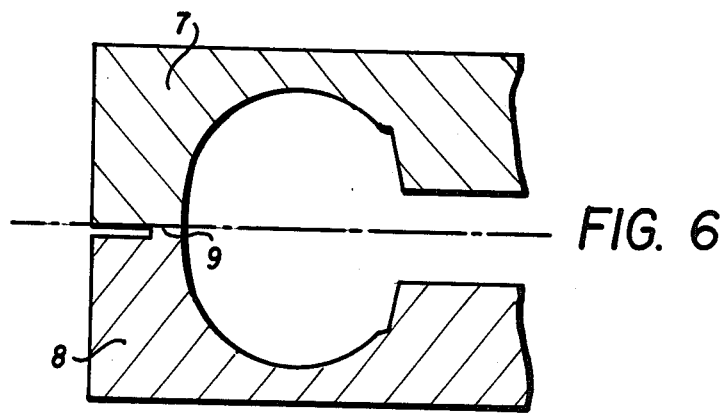

FIGS. from 5 to 9 illustrate various cross-sections of the device according to the invention, as applied to two diverse types of tire moulds.

Now considering FIG. 1, there is shown a generic device, used for moulding plastic or elastomeric articles, comprises two element 1 and 2 respectively, that are alternatively couplable and separable from one another, each being provided with an open hollow zone (3 and 4) so that, in their coupled position, they together delimit a cavity, closed tot heoutside ambient, having its shape resembling the outer form of the article to be produced. The surfaces that come into reciprocal contact when the mould is closed, are the surfaces a on the element 1, and the surfaces b on the element 2.

Said surfaces, according to the known techniue are parallel to each other and they correspond perfectly, apart fromt he already cited angular errors of flatness.

Instead, according to the invention, at least one of said surfaces for example the surface b of the element 2, presents an inclination with respect to the bedding plane y of the corresponding facing surface, whose angular value is chosen in ratio to the material that forms the element, so much so that, during the reciprocal approachng movement, between the mould-members, the surfaces a and b come together in contact, firstly along a closed line that delimits the mould cavity, whose intersection, with the drawing plane, is located by point B. Let us now imagine the carrying out of the first operation for closing the mould, with using a new mould. By keeping in mind that the elements forming the mould are coupled together under high closing pressures, in the order of some tones, it is easy to surmize that the specific pressure, acting on the line located by said point B, is so enormous, as to amply overcome not just the elastic limit, but also that of the plasticity of the material forming the mould, which is why the material deforms.

It is hardly necessary to specify here, that the drawings are only for the sake of the explanation and therefore, only represent the qualitative outline of the phenomenon, and not its actual dimensions which involve dimensional variations in the order of a tenth of a millimeter, depending however, on the nature of the material used, and hence, neither representable nor appreciable in the attached drawings.

Owing to the effect of deformation in the portion of material around the point B (on the line where B represents the intersection with the drawing plane), an increasingly greate rportion of surface b abuts against the corresponding surface 1 and simultaneously, the specific pressure on the zone involved reduces in value, thus descending to below the threshold of plasticity for the material, for thus entering into the field of elasticity.

The deformation of the element 2, but generally of both the elements 1 and 2, therefore continues elastically with consequently, further increasing the area of the contacting surfaces up till when the reaction of the material balances the closing thrust of the mould.

In FIG. 2, with the lines b, b' and b", there have been indicated the profiles of the surface b of the element 2, and those of the contracting surfaces between the two elements (on the drawing plane), respectively with a new mould (profile I—I), deformed plastically (profile II—II), and also deformed elastically (profile III—III) together witht he portions of the element 2 that are involved witht he above-said deformations. The portion shown by line with dots and long dashes, indicates the plastic deformation; the line with heavy dashes, indicates the elastic deformation.

If now, the mould were to be re-opened, the portion of the element that is deformed just elastically, would go back to its initial state; whereas, the portion that is deformed plastically, would be permanently deformed, so much so that, the new profile of element 2, will substantially be that of the profile b' in FIG. 2.

For all the successive closings of the mould, the contact between the surfaces a and b, will now become established simultaneously, on the entire area of b that is already deformed plastically (profiel II-II), and as a result, the specific pressure of the contacting area will never exceed the threshold of plasticity for the material and the elements 1 and 2 will only deform elastically.

It is easily understood how the plastically deformed portion, in undergoing said deformation, has realized a practically perfect coupling with a portion of the corresponding surface, by eliminating or counter-balancing all the irregularities in form of the elements (angular errors etc.) which caused imperfect couplings—so much so that now, there are no longer any spaces existing wherein a burr could form.

Morover, said plastic deformation on the element 2, has allowed for the recovery of all the clearances that existed between the elements 1 and 2, whereas the possibility of having a more ample elastic deformation provided to the mould-members, assures the perfect closing of the mould from the level of the eliminating of burrs in the mould itself.

It is obvious that both the surfaces, a and b, could be inclined with respect to the plane of profile I—I (FIG. 2). The only fact that should be taken into account is just the total value of the angle x existing between the two surfaces.

Since the invention has now been examined in its more general aspect, some particular examples, even including equally convenient alternative variations, will be provided herebelow.

FIGS. 3 and 4 illustrate a further way of realizing the invention according to which, during the mould-closing operation, upon one of the two facing and opposed reciprocally contacting surfaces, there is made, by the removal of material, a projecting part 5 having such dimensions in ratio to the type of material used, that the surface pressure, exercised upon the area c of the projecting part 5, is of a higher value than the threshold of plasticity of the projecting part's material, i.e. material used for the corresponding mould-member.

The projecting part 5 then deforms (just as indicated in FIG. 4), first plasticlaly and thereafter elastically, substantially as in the previously illustrated case. Therefore, the very same considerations which, for that mattera, are easily transferable to the example in question, are valid here.

In particular, in order to have an elasto-plastic deformation of just the projecting part, the area of the surface c of the said projecting part, once again, will be sensibly less than the area of the remaining portion of surface from where the said projecting part protrudes.

FIG. 5 illustrates a convenient way for realizing the invention in a tire mould of the so-called "two-halves" type, i.e. formed by two hollow elements 7 and 8, defined as "shells", that are provided with an annular cavity opened outwardly, so much so that when recirpocally coupled together they define a toroidal cavity apt for containing the tire to be vulcanized.

According to the invention, at least the surface of one of said shells, facing the other shell, is a conical surface having its apex V on the mould axis. The angular opening of the said surface, corresponding here to the angle w, between the axis of symmetry of the mould and the line r on the plane of the cross-section, depends upon the material that is used for realizing the shell. In the case of steel moulds, the angle w will, for convenience sake, not be less than 87° sexagesimals.

Naturally, there is nothing to exclude that even the corresponding surface of the facing shell is shaped conically, either with the same angle or with a diverse angle, with respect to that of the corresponding surface; the important characteristic, according to the invention, having to be, in the case of steel moulds, that the angle z between the two facing surfaces, should not exceed 3° sexagesimals.

The effective value prevailingly and opportunely used, is moreover, in the order of one degree.

On the other hand, should it be desired, as shown in FIG. 6, to realize the solution of the projecting part, in just as convenient a manner, a continuous annular projecting part 9 is made, at least on the surface of one of the two facing shells, in such a position as to delimit byitself, the concave portion of the shell 8.

Figure 7:
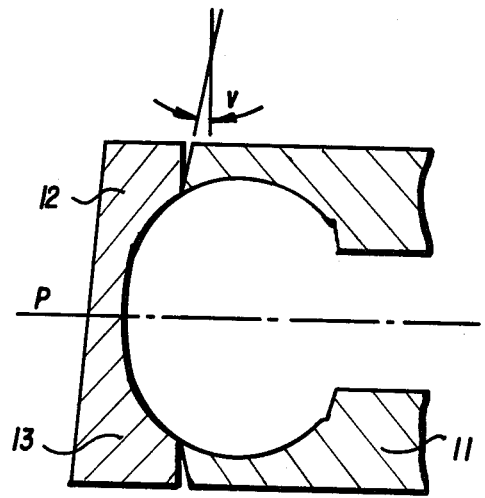
Figure 8:
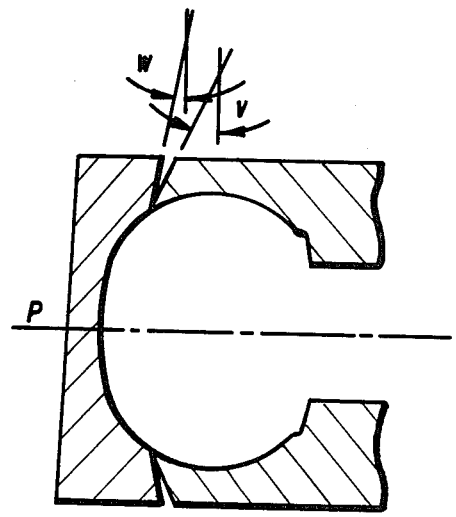
Figure 9:
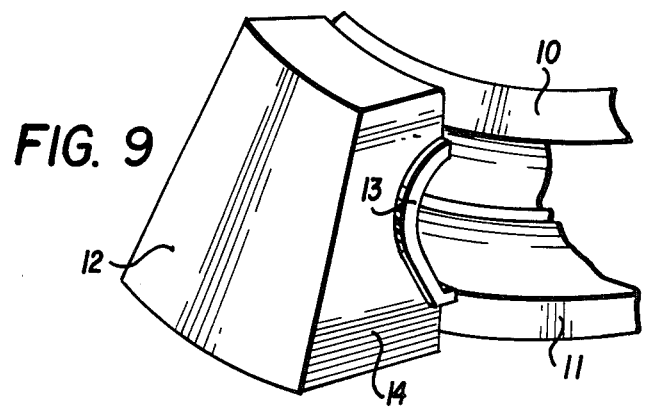

Let us now consider a tire vulcanizing mould, of the well-known centripetal type,just as the one schematically illustrated in FIGS. 7, 8 and 9.

Said mould, that is much more complex than the previous one, is made of two annular coaxial and opposed elements (10 and 11) substantially concave, defined as 'cheeks', axially and reciprocally shiftable in both senses, apt for moulding the sidewalls of a tire, and by a plurality of radial elements 12, disposed circumferentially, coaxially to said mould, usually defined as 'sectors', axially shiftable in both senses with respect to one of said cheeks radially shiftable in both senses with respect to both the cheeks, apt for moulding the crown portion of a tire.

As already explained at the beginning of the present description, the phenomenon of 'burrs' is particularly difficult to solve with these moulds. However, even in these moulds the device of the invention has allowed for efficaciously solving the problem, in particular, through a combination of the already illustrated versions, for realizing the invention.

In other words, the cheeks 10 and 11 (FIG. 7) present their circumferential surfaces facing the sectors, inclined with respect to the facing surfaces, in ratio to the radial direction of the relative shifting between cheeks and sectors; i.e. said surfaces are conical surfaces having their apex on the mould axis, preferably on the same side of the surface, with respect to the diametral plane p of the mould. The angle between the two surfaces coinciding with the angular opening v of the cheek surface when the corresponding surface of the sector is a cylindrical surface coaxial to the mould, has conveniently the value of about 1° sexagesimals; for steel moulds however, the value does not exceed 3° sexagesimals.

When both the corresponding surfaces of the sectors and of the cheeks, are conical surfaces, quite conveniently said surfaces will have their apex on the mould axis, both on the same side, for example, as is illustrated in FIG. 8; the difference between the angles w and v however, being contained preferably within a value of 3° sexagesimals.

On the flanks of the sectors, i.e. on the facing radial surfaces between the adjacent sectors, the solution of the conicity of the surfaces is economically too burdensome, as it requires processing the surfaces accoding to variable bending radii, from one point to another, along the profile of the cavity, that is also developed in the radial direction.

Therefore, the solution of the problem of a projecting part finds quite a convenient application. The said projecting part 13, realized according to the same already-cited criteria illustrating the FIGS. 3 and 8, becomes developed along the rim of the hollow portion of the sector and instead, it delimits the profile by itself, as is clearly illustrated in FIG. 9; in this quite convenient manner, the radial surfaces of the projecting part and of the sector facing the adjacent sectors, can remain as flat surfaces that are hence, easily and economically workable.

For realizing the elasto-plastic deformability of said projecting part, its volume i.e. the volume of the part protruding from the lateral surface 14 of the sector 12, will be chosen adequately as a ratio of the mechanical characteristics of the material from which the above-said sector is made. Moreover, since the pressure for deforming the projecting part is an exceedingly higher pressure to that of the moulding, the value necessary for guaranteeing the perfect closing of the mould, can even be obtained for very small projecting parts having a height in the order of one tenth of a millimeter, in the case of steel, and however, not exceeding 0.50 mm.

For example, for a steel mould, apt for vulcanizing automobile tires of size 155-SR13, the Applicant has found it opportune to make, upon one of the two radial surfaces of each sector, a projectng part extended along the entire profile of the cavity, having a height equal to 0.15 mm, and a width (in the radial direction) equal to 3.5 mm.

It now results clear how the device of the invention, eliminates all the described disadvantages, with also obtaining all the already described advantages. In particular, all the burrs on the finished product are eliminated or drasticlaly reduced, without giving rise to complex or costly processings on the surfaces of the corresponding elements destined for coming into reciprocal contact.

It also results as beign obvious that this invention is not strictly limited to what has been described hereabove, but that also intended as beign included in it, are all those solutions and alternative contrivances, although not expressly described here, which nevertheless, are easily deducible by the one skilled in the art, from the present inventive idea.

What is claimed is:

1. A device for moulding elastomeric or plastomeric articles comprising:
    at least two mould elements defining a mould cavity therebetween;
    means for moving and applying pressure to said mould elements to move said elements from a first shut position to a second spaced apart open position;
    said elements having facing surfaces for contact with each other to delimit said cavity;
    at least a portion of one of said facing surfaces immediately adjacent the cavity, prior to the first use of the device, being plastically deformable under pressure from said means for moving so that during the first use when said portion of said facing surface of the mould element is moved into contact with its mating facing surface, said at least one portion will undergo a permanent deformation due to said plastic deformability, thereby increasing the area of first contact between said facing surfaces for all subsequent closing of the mould.

2. The device of claim 1 in which one of said facing surfaces is inclined with respect to its corresponding facing surface, the distance between said facing surfaces increasing progressively in a direction parallel to the direction of movement between the elements.

3. The device of claim 1 in which said at least one portion comprises a projecting part extending along the profile of said cavity and protruding from the facing surface of which it is a part.

4. The device of claim 1 comprising a tire mould defining a substantially toric shaped cavity for shaping a tire in which the surface of at least one of the elements is conical having its apex on the axis of symmetry of the mould.

5. The device of claim 1 comprising a tire mould having two substantially concave elements defining a substantially toric shaped cavity for shaping a tire in which at least one of the facing s urfaces has a continuous annular projectng part to delimit the concave part of the corresponding element.

6. The device of claim 1 comprising a tire vulcanizing mould having a pair of sidewall mould elements mounted for axial movement and plurality of radially movable tread segment mould elements disposed coaxially to said sidewall moulds with the circumferential surface of at least one of said elements being a conical surface having its apex lying on the axis of vulcanizing mould.

7. The device of claim 6 in which the circumferential surface of one of said sidewall mould elements, facing said tread segment mould, is a conical surface having its apex lying on the axis of said mould.

8. The device of claim 6 in which the circumferential surface of each tread segment mould element, facing a circumferential surface of a sidewall element, is a conical surface having the same inclination but having a lesser angular opening that that of the corresponding surface of the sidewall mould.

9. The device of claim 6 including tread mould sectors of steel with at least one of the radial surfaces of each sector facing adjacent sectors having a projecting part to delimit the radial inner profile of the concave portion of said sector and protruding from said surface for a height of not more than 0.10 mm.

* * * * *